Oct. 20, 1942.  H. HELLWIG  2,299,143
PIPE CONNECTION
Filed June 14, 1941
Fig.1.
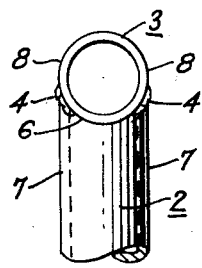
Fig.2.
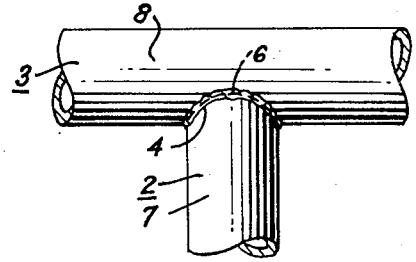
Fig.3.
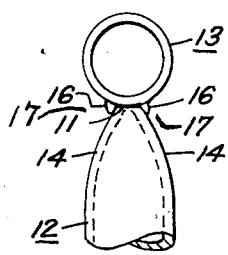
Fig.4.
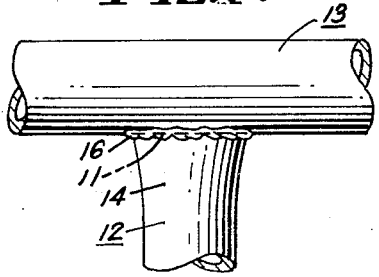
Fig.5.
Fig.6.
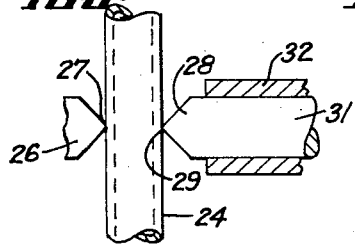
Fig.7.
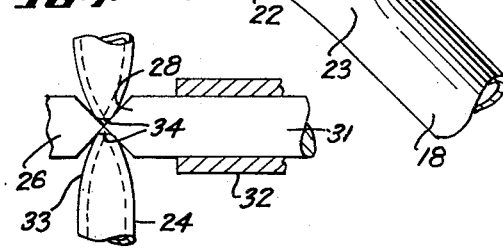
Fig.8.
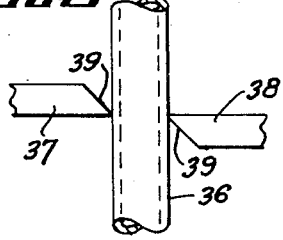
Fig.9.
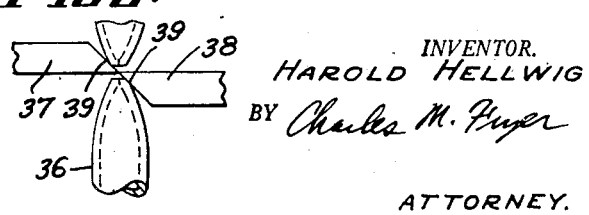
INVENTOR.
HAROLD HELLWIG
BY Charles M. Fryer
ATTORNEY.

Patented Oct. 20, 1942

2,299,143

UNITED STATES PATENT OFFICE 2,299,143

PIPE CONNECTION

Harold Hellwig, Los Gatos, Calif.

Application June 14, 1941, Serial No. 398,084

4 Claims. (Cl. 287—54)

My invention relates to metal fabricating, and more particularly to a connection between tubular metal members, such as pipes.

It is quite customary in the manufacture of structures, such as brackets, posts, railings and stands, to employ metal pipes of the desired size, and secure such pipes together by welding. Heretofore, the usual practice has been to shape an end of one pipe so as to fit about the surface of another pipe, so that the two pipes may be secured together by welding at the junction of the two pipes. Such shaping of a pipe end in order to fit properly over an adjacent pipe, requires the formation of a predetermined curvature on such pipe end.

Heretofore, the desired curvature has usually been formed by burning with a torch, grinding away metal, or by a milling cutter. In addition to the care which must be taken to obtain the right curvature, such procedures are rather expensive and time-consuming. Furthermore, when adjacent pipes are welded together, and the pipes are of the same diameter, the welding will project from opposite sides of the pipe having the curved end, causing an unsightly appearance. Also, in the case of railings, the heretofore employed pipe connection is disadvantageous inasmuch as there is insufficient room for providing a satisfactory hand grip at the railing joint.

My invention is designed to overcome the previously described objections in pipe connections of the character related, and has as its objects, among others, the provision of an improved connection of the character described, which is of economical construction, is free from interference at the railing joint when employed in railing construction, and which can be economically manufactured by a novel and improved method. Other objects of my invention will become apparent from a perusal of the following description thereof.

Referring to the drawing:

Fig. 1 is an end elevational view of a connection of prior construction;

Fig. 2 is a side elevational view of a connection of Fig. 1;

Fig. 3 is an end elevational view, similar to that of Fig. 1, of the improved connection of my invention;

Fig. 4 is a side elevational view of the connection of Fig. 3;

Fig. 5 is a side elevational view of another embodiment of the improved connection of my invention, wherein a plurality of pipe members forming such connection are secured together at an oblique angle with respect to each other;

Fig. 6 is a schematic view illustrating one embodiment of apparatus enabling the improved method for forming my improved connection; the parts being shown in position prior to shaping of one of the pipes;

Fig. 7 is a view similar to that of Fig. 6, illustrating shaping of the pipe;

Fig. 8 illustrates schematically another embodiment of apparatus enabling the improved method of my invention; the parts being shown in position prior to shaping of one of the pipes;

Fig. 9 is a view similar to that of Fig. 8, illustrating shaping of the pipe.

With reference to Figs. 1 and 2, which illustrate a joint or connection heretofore employed, such connection is formed by securing an end of one pipe 2 to the surface of an adjacent pipe 3 by means of welding 4. Such construction involves formation of a predetermined curvature 6 at the end of pipe 2; so that the two pipes may fit accurately together. Also, if pipes 2 and 3 are of the same diameter, which is usually the case for pipe connections of this character, the opposite side surfaces 7 of pipe 2 which has the curved end, will be in alinement with opposite side surfaces 8 of pipe 3. As a result, welding 4 will be in substantial alinement with surfaces 8 and 7. This renders it difficult to provide a neat and smooth outside surface along the welding. Furthermore, as will be apparent from Fig. 1, if pipe 3 is employed as a railing, there is insufficient room for a proper hand grip at the junction between pipe 3 and pipe 2.

In one embodiment of the improved joint of my invention, illustrated in Figs. 3 and 4, the end 11 of pipe 12, instead of being formed with a curvature adapted to fit about pipe 13, is relatively narrow and substantially straight; such end being formed by pinching together opposite side portions 14 of pipe 12 adjacent end 11, which results in substantial flattening of such opposite side end portions 14. The flattened end portion is positioned with its major axis disposed longitudinally of the pipe 13, and the minor axis of the flattened end portion is of such amplitude that the projection of the end face of the flattened end portion on the pipe 13 defines an area having substantially straight side edges extending substantially longitudinally of the pipe 13. The straight end 11 extends axially of and is secured to pipe 13 in substantially straight line contact therewith, by welding 16 along the opposite side portions 14 adjacent end 11; and by virtue of the flattened side portions 14, a recess 17 is formed adjacent each of the opposite side portions 14 and also adjacent the surface of pipe 13 to which end 11 is secured.

Such recesses 17 provide ample room for receiving welding 16. As a result, welding 16, after being burnished or ground down, will be amply hidden to provide a neat appearing structure. Also, as can be readily observed from Fig. 3, when the pipe 13 is used as a railing, the improved connection will not interfere with gripping railing 13 at the conection, as there is ample hand grip room at such connection by virtue of recesses 17. Besides the advantages pointed out, the improved connection of my invention is more economical than the previously described prior connection.

There are many uses for the joint or connection of my invention, in addition to employment thereof in railing constructions. For example, pipe 13 may be a bracket to support objects, and pipe 12 a post or stand therefor. In the embodiment of Figs. 3 and 4, pipe 12 is at a right angle to pipe 13. However, where conditions require, pipe 12 and pipe 13 need not be at a right angle with respect to each other. In this connection, Fig. 5 illustrates the same type of connection as that of Figs. 3 and 4, but with a pipe 18 at an oblique angle to pipe 19; pipe 18 being formed with relatively narrow and substantially straight end 21 extending axially of and secured to the surface of pipe 19 in substantially straight line contact therewith, by welding 22 along each side of opposite pinched together, flattened end portions 23, similar to portions 14 of pipe 12. The construction of Fig. 5 is particularly adapted for stairway railings, in which pipe 19 may serve as the railing and pipe 18 as a supporting post.

Figs. 6 and 7 illustrate one form of apparatus for shaping end portions of a pipe 24, similar to the shaping of the ends of pipes 12 and 23. Such apparatus comprises a stationary V-shaped cutting die 26 having shearing edge 27, and a cooperating V-shaped movable cutting die 28 having a shearing edge 29 in alinement with edge 27. Such movable die 28 may be mounted on any type of mechanism adapted to be reciprocated back and forth, such as hydraulic ram 31 movable in cylinder 32. With a pipe in position between dies 26 and 28, movement of die 28 toward die 26 as is illustrated by Fig. 7, will result in formation of opposite pinched together side portions 33, corresponding to similar portions 14 and 23, and relatively narrow and substantially straight edges 34 which may be welded in the manner previously described.

In this connection, it will be noted that if shearing edges 27 and 29 are sharp enough, the described method will result not only in formation of straight edges 34 but also in simultaneous cutting of the pipe in two. If a subsequent cutting of the pipe is necessary, should the dies 26 and 28 not completely sever it, this may be readily accomplished by placing the formed pipe in proper position in a suitable cutting machine, such as a punch shear, and shearing along the line of edges 34

V-shaped dies need not necessarily be employed, although they are preferred. Figs. 8 and 9 illustrate another form of apparatus similar to that of Figs. 6 and 7, by which a pipe 36 may be shaped in the same way as that previously described, but which employs plain beveled shearing members 37 and 38 having oppositely alined shearing edges 39.

In both forms of apparatus, it will be readily apparent that by inclining the pipe at any desired angle with respect to the shearing edges, the resulting straight cut end thereof, adapted to be secured to the surface of an adjacent pipe, may be formed at any desired oblique angle with respect to the axis of the pipe to provide the form of connection illustrated by Fig. 5. The method of my invention, wherein opposite side portions of a pipe adjacent an end thereof are flattened to provide a relatively narrow and substantially straight end adapted to be secured to the surface of an adjacent pipe, not only enables a more economical and simple joint or connection to be manufactured than those heretofore employed, but also is more economical than previous methods which require forming a proper curvature on the end of one of the pipes adapted to be secured to the surface of an adjacent pipe.

Although in the drawing I have illustrated only one tubular member or pipe, secured to the surface of a similar tubular member or pipe, it is apparent that more than one pipe may be secured to the surface of another pipe. Because of the large amount of room which the connection of my invention permits, a plurality of pipes may even be secured about the surface of another pipe at the same location. In this connection, it is apparent that the pipe with the substantially straight end need not be secured medially to an adjacent pipe but by virtue of the room which obtains because of the flattened or pinched together side portions, such pipe may be readily secured to the surface of an adjacent pipe in off-set relationship with respect thereto.

I claim:

1. Two angularly disposed and connected pipes, one of said pipes having a flattened end portion with its major axis disposed longitudinally of said other pipe and its minor axis of such amplitude that the projection of the end face of said flattened end portion on said other pipe defines an area having substantially straight side edges extending longitudinally of said other pipe, said flattened end portion being free from such preshaping as would be required to conform said end portion in its unflattened condition to the curvature of said other pipe.

2. Two angularly disposed and connected pipes, one of said pipes having a flattened end portion with its major axis disposed longitudinally of said other pipe and its minor axis of such amplitude that the projection of the end face of said flattened end portion on said other pipe defines an area having substantially straight side edges extending longitudinally of said other pipe, said flattened end portion being free from such preshaping as would be required to conform said end portion in its unflattened condition to the curvature of said other pipe, and a weld union securing said flattened end portion to said other pipe.

3. Two angularly disposed and connected pipes, one of said pipes having a flattened end portion with its major axis disposed longitudinally of said other pipe and its minor axis of such amplitude that the projection of the end face of said flattened end portion on said other pipe defines an area having substantially straight side edges extending longitudinally of said other pipe, said flattened end portion being free from such preshaping as would be required to conform said end portion in its unflattened condition to the curvature of said other pipe, and welding along opposite longitudinal side edges of said flattened end portion securing the latter to said other pipe.

4. A pipe railing construction comprising a railing pipe and an angularly disposed supporting pipe connected thereto, said supporting pipe having a flattened end portion with its major axis disposed longitudinally of said railing pipe and its minor axis of such amplitude that the projection of the end face of said flattened end portion on said railing pipe defines an area having substantially straight side edges extending substantially longitudinally of said railing pipe, said flattened end portion being free from such preshaping as would be required to conform said end portion in its unflattened condition to the curvature of said other pipe, and welding along opposite sides of said flattened end portion and securing said end portion to said railing pipe, said flattened end portion forming recesses respectively at each side thereof adjacent said railing pipe, whereby hand grip room extending more than half way round said railing pipe is provided at said connection.

HAROLD HELLWIG.